R. G. McMULLEN.
TIRE FOR VEHICLE WHEELS.
APPLICATION FILED OCT. 18, 1916.
1,305,819.
Patented June 3, 1919.
2 SHEETS—SHEET 1.
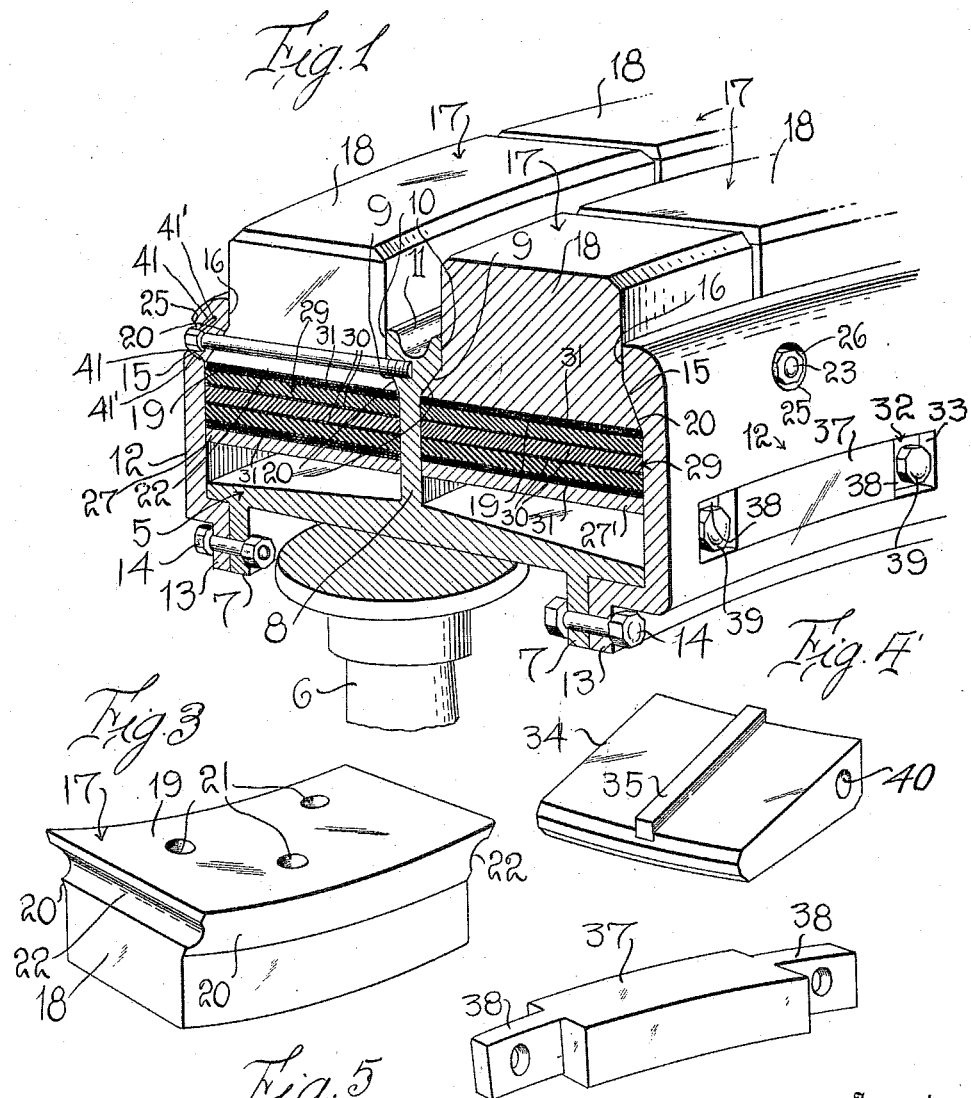
Inventor
R. G. McMULLEN
By Watson E. Coleman
Attorney

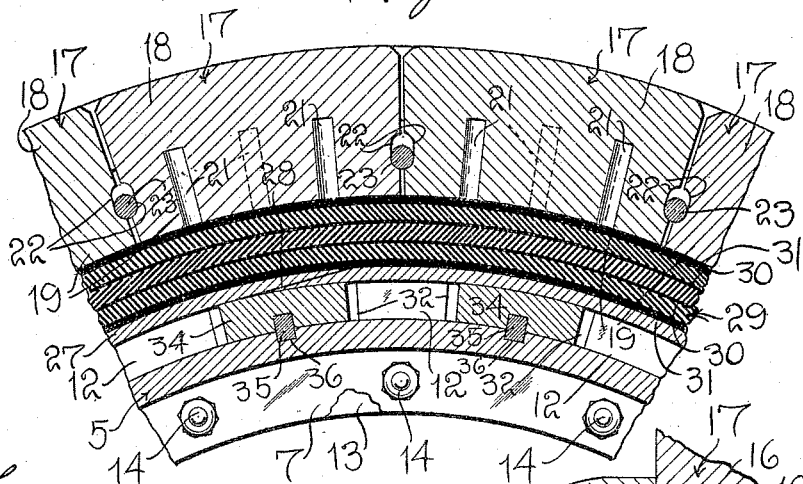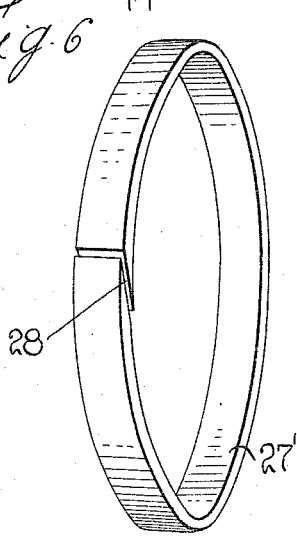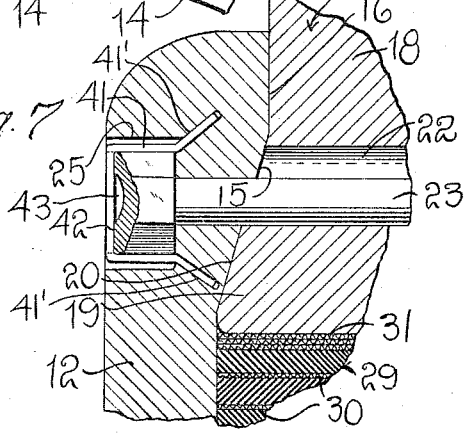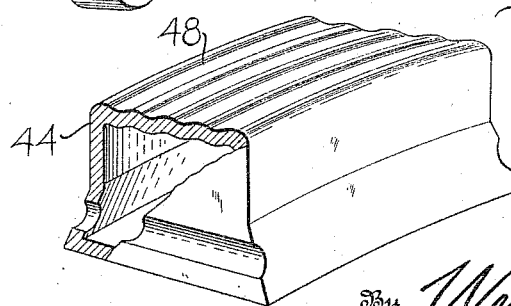

UNITED STATES PATENT OFFICE.

ROBERT G. McMULLEN, OF PORTLAND, OREGON.

TIRE FOR VEHICLE-WHEELS.

1,305,819.  Specification of Letters Patent.  Patented June 3, 1919.

Application filed October 18, 1916. Serial No. 126,372.

*To all whom it may concern:*

Be it known that I, ROBERT G. McMULLEN, a citizen of the United States, residing at Portland, in the county of Multnomah and State of Oregon, have invented certain new and useful Improvements in Tires for Vehicle-Wheels, of which the following is a specification, reference being had to the accompanying drawings.

This invention relates to an improved tire for vehicle wheels and has for its primary object to provide a resilient tire for motor truck wheels, which will be exceedingly strong and durable and at the same time have a maximum of elasticity.

It is another and more particular object of the invention to provide a truck wheel tire having a plurality of wood tread blocks, and means for resiliently cushioning the tread blocks upon the wheel rim for relative, independent, radial movement.

It is a further detail object of the invention to provide a tire structure embodying a metallic rim having spaced flanges, an expansible metallic ring surrounding the rim, an inclosed elastic tire disposed between the flanges on the rim outwardly of said expansible ring, said tire forming a resilient bed for the tread blocks, and means insertible between the outer face of the wheel rim and the elastic ring to expand the latter and place the elastic tire under compression, whereby the tread blocks are normally urged outwardly.

It is a further general object of the invention to provide a resilient tire construction which may be advantageously employed upon the wheels of armored military trucks or other relatively heavy vehicles, and is capable of withstanding the most severe usage with a minimum of wear, the tire as a whole consisting of comparatively few simply constructed parts, the manufacturing cost of which is relatively small.

With the above and other objects in view, my invention consists in the novel features of construction, combination and arrangement of parts to be hereinafter more fully described, claimed and illustrated in the accompanying drawing, in which, Figure 1 is a sectional perspective view illustrating the preferred embodiment of my improved truck wheel tire;

Fig. 2 is a fragmentary longitudinal section;

Fig. 3 is an inverted perspective view of one of the tread blocks;

Fig. 4 is a similar view of one of the wedge members;

Fig. 5 is a perspective view of the removable block for the wedge receiving opening in the side plate of the tire;

Fig. 6 is a perspective view of the expansible metal ring;

Fig. 7 is a detail section showing the means for locking the transverse connecting bolts; and Fig. 8 is a detail perspective view of a hollow, metal tread block.

Referring in detail to the drawings, 5 designates the metal rim of the truck wheel, to which the outer ends of the radially disposed spokes 6 are securely fixed in any approved manner. This rim 5 is provided adjacent its opposite edges with the inwardly projecting, annular flanges 7 for a purpose to be presently stated. The rim 5 is further provided with an integral, outwardly projecting, annular web 8 centrally formed thereon. The outer face of the rim 5 is gradually inclined transversely from each of its side edges in an outward direction to the web 8. The outer edge portion of this web gradually increases in thickness to afford the obliquely inclined side faces 9, the extreme outer edge portion of said web having the relatively narrow, annular side faces 10. The peripheral face of the web 8 is circumferentially grooved or channeled, as at 11.

12 designates the metal side plates of the wheel tire, each of which is of continuous annular form and engages against one edge of the rim 5. Each side plate 12 is formed with an angular flange 13 which extends under the rim 5 and is rigidly fixed at spaced intervals by means of the bolts indicated at 14, to one of the flanges 7 on the rim. The inner face of the outer portion of the side plate 12 is beveled or inclined, as at 15, in convergent relation to the opposed inclined side face 9 on the web 8. The inner face of the plate 12, at its outer edge, is likewise provided with an annular portion 16, which corresponds to the annular faces 10 on the web 8 of the wheel rim.

The tread blocks 17 are of similar form and construction. I have found that a tread block of Osage orange, or greenheart wood gives the best service in practical use. These woods, according to tests made by the United State Forestry Bureau, are the densest and most durable woods known, and are capable of withstanding very high pressures, excessive friction, and temperature changes with comparatively little wear or disintegration. Each of these tread blocks 17 has a substantially rectangular portion 18 and a flaring, gradually widened portion 19 provided with outwardly inclined side faces 20 having approximately the same angularity as the faces 9 and 15 of the web 8 and the side plates 12. The inner face of each tread block is slightly concave and the outer face slightly convex in substantial concentricity to the wheel radius. Each block has three sockets or recesses 21 bored into the same from its inner concave face, said bores being provided for the purpose of equalizing expansion and contraction due to temperature changes and being preferably arranged in triangular formation. In the opposite end faces of the tread block, the channels or grooves 22 are provided for the purpose of accommodating the connecting bolts 23 which are threaded in recesses 24 in the web 8 and engages through openings in the side plates 12. A countersink indicated at 25 is preferably formed in the outer face of each side plate around the bolt openings to receive the bolt heads which are formed upon one of the ends of said bolts. The channels or grooves 22 in the end faces of the tread blocks are of such depth that the bolts 23 will maintain the opposed end faces of the blocks in slightly spaced relation, such space being approximately one-twelfth of an inch in width, which is amply sufficient to permit of the independent radial movement of the blocks without frictional contact upon each other.

Between the web 8 on the wheel rim and the side plates 12, the split, expansible, metal rings 27 and 27' are adapted to be arranged, the extremities of each ring abutting or contacting in a scarf joint, as indicated at 28. 29 designates the rubber tires. These rubber tires are of solid construction and are entirely inclosed and concealed between the side faces and the web 8 of the wheel. The resilient tires are each made up of a series of layers of rubber having fabric strips 30 interposed therebetween, and the inner and outer faces of each of these annular tires are also covered by one or more fabric layers 31 suitably vulcanized thereto.

Each of the side plates 12 is formed with a plurality (preferably ten), of elongated, circumferentially extending openings 32, and at the opposite ends of each of these openings a recess or mortise 33 is formed in the outer face of the plate 12. The lower edge of the openings 32 is disposed substantially in the plane of the outer inclined face of the metal rim 5. Wedge members 34 are adapted for insertion through the openings 32 and each of these members is provided in one face with a longitudinally extending key 35 for engagement in a keyway 36 formed in the inclined face of the rim 5. Metal blocks or bars 37 are adapted to be engaged in each of the openings 32, said blocks being provided with terminal ears 38 to seat in the mortises 33. The ears 38 are apertured to coincide with threaded sockets in the plate 12 and are adapted to receive the fastening screws 39, whereby the blocks 37 are detachably held in place.

In assembling the several parts of the tire, the wheel is laid in a horizontal position, the plates 12 being removed and one circular series of tread blocks 17 is arranged upon the upper side of the web 8 with the portions 18 of said blocks projecting outwardly beyond said web. The rubber tire 29 is now arranged in position against the inner faces of said blocks and the expansible metal ring 27 then placed within said tire. The side plate 12 is now securely bolted upon the rim 5, care being taken not to tighten the clamping bolts 23 too much, which would prevent the radial shifting movement of the tread blocks. The wedge members 34 are now introduced through the openings 32 and driven home between the inclined face of the rim 5 and the opposed expansible ring 27. As the smaller ends of these wedge blocks approach the web 8, said split ring is gradually expanded against the tire 29 and the latter is placed under compression. The wedges are preferably inserted alternately from diametrically opposite points on the wheel so as to equalize the compressing pressure upon the tire 29. It is important, in placing the expansible ring 27 in position, that the joint 28 shall be in line with one of the openings 32 so that one of the wedge members 34 will directly contact with the ring at this joint. The wheel is then turned over and the tread blocks and a cushioning tire arranged on the other side thereof in the same manner. Normally, the tire 29 is of somewhat greater thickness than the space it occupies so that there will be sufficient compression of the tire to cause the inclined faces 20 of the tread blocks to fit snugly against the inclined faces 9 and 15 on the web 8 and the side plates 12. Each of the wedge members 34 is preferably provided with a transverse opening indicated at 40, in the ends of which the jaws of a suitable tool may be engaged for the purpose of removing said members and withdrawing them through the openings 32.

As the bolts 23 are not tightened up securely, I have provided a locking means therefor comprising a substantially U-shaped, soft metal rod 41 which is adapted to embrace the head of the bolt. The bolt head is provided in its outer face with a slot or groove 42 to receive said wire and a central depression 43 which is bisected by said groove. In the plate 12, on diametrically opposite sides of the bolt head, oppositely extending, obliquely inclined holes 41' are bored to receive the terminal portions of the locking rod 41. It will thus be understood that by engaging the ends of the rod 41 in these openings and driving the same home with a hammer or sledge, the end portions of the rod are angularly bent as seen in Fig. 7, and the medial portion of said rod seated within the channel or groove 42 in the bolt head. The depression or recess 43 provides means for the convenient insertion of a tool beneath the medial portion of the locking rod, whereby the same may be readily withdrawn.

From the foregoing description, taken in connection with the accompanying drawings, the construction and manner of assembling the several parts of my improved truck wheel tire will be clearly and fully understood. The present invention provides a substantially continuous, fibrous, wood tread for the truck wheel which will withstand all ordinary road conditions without injury, for use upon motor delivery trucks. As the load is successively borne by the tread blocks, said blocks are forced inwardly to a slight extent with respect to the bolts 23, such inward movement being resiliently cushioned by the elastic tires 29. Thus, delays incident to punctures or other tire troubles, as commonly experienced in the use of a pneumatic tire, will be eliminated. At the same time, it will be seen that the tire structure includes but few parts which are exceedingly simple and, therefore, of great durability. The resilient tires being completely inclosed and protected from wear or injury will endure as long as the wheel itself remains in service.

In the use of my improved truck tire upon armored military trucks, hollow cast steel blocks 44 may be substituted for the wood blocks 17, and these hollow metal blocks may be provided with corrugated tread surfaces, as indicated at 48 in Fig. 8 of the drawings, thus affording a firm tractive engagement on ice and muddy road surfaces and under similar conditions, whereby skidding or sliding of the vehicle wheel is obviated. It will, of course, be understood that, if desired, upon the front vehicle wheels a single tread may be used, one circular row of the tread blocks 17 being dispensed with. In such construction, it is of course manifest that the rim 5 will not be provided with a central web, but the blocks will be arranged between the opposite side plates 12. As this single row arrangement of the tread blocks will be at once apparent to those skilled in the art, illustration thereof is deemed unnecessary.

From the above, it will be seen that I have devised a truck wheel tire of great convenience and serviceability in practical use. The several elements employed may be very easily and quickly assembled in the completed tire structure or disassembled for the purpose of periodically renewing the tread blocks.

While I have shown and described the preferred form, construction and arrangement of the various parts, it is to be understood that the same are susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

A resilient tire for trucks including a channel-shaped rim, a series of tread blocks radially movable in the rim channel, resilient compressible cushioning means arranged between the tread blocks and the base of the channel, the outer face of the channel base being transversely inclined, an expansible metal ring engaged against the inner surface of the cushioning means, said inclined rim face having spaced slots therein, and wedge blocks insertible between the expansible ring and the inclined face of the rim and having keys for engagement in said slots, said wedge blocks expanding the metal ring to compress the cushioning means and urge the tread blocks outwardly.

In testimony whereof I hereunto affix my signature in the presence of two witnesses.

ROBERT G. McMULLEN.

Witnesses:
GEO. A. RIES,
C. F. FISHER.

Copies of this patent may be obtained for five cents each, by addressing the "Commissioner of Patents, Washington, D. C."